(12) United States Patent
Hanrahan (10) Patent No.: US 12,331,683 B2
(45) Date of Patent: Jun. 17, 2025

(54) BEARING ARRANGEMENT FOR TURBINE ENGINE GEARTRAIN

(71) Applicant: RTX Corporation, Farmington, CT (US)

(72) Inventor: Paul R. Hanrahan, Sedona, AZ (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/375,102

(22) Filed: Sep. 29, 2023

(65) Prior Publication Data

US 2025/0109708 A1    Apr. 3, 2025

(51) Int. Cl.
F16H 1/28    (2006.01)
F02C 7/06    (2006.01)
F16H 57/08   (2006.01)
F02C 7/36    (2006.01)

(52) U.S. Cl.
CPC ............. *F02C 7/06* (2013.01); *F16H 1/28* (2013.01); *F16H 57/08* (2013.01); *F02C 7/36* (2013.01); *F16H 2057/085* (2013.01)

(58) Field of Classification Search
CPC .... F02C 7/06; F02C 3/107; F02C 7/36; F05D 2260/40311
See application file for complete search history.

(56) References Cited

U.S. PATENT DOCUMENTS 3,678,690 A    7/1972   Shohet
4,651,521 A    3/1987   Ossi
4,791,783 A    12/1988  Neitzel
4,799,354 A    1/1989   Midgley
4,817,382 A    4/1989   Rudolph
4,936,748 A    6/1990   Adamson
4,997,414 A    3/1991   Camara
(Continued)

FOREIGN PATENT DOCUMENTS

CN    111279060 B    3/2023
CN    107856488 B    12/2023
(Continued)

OTHER PUBLICATIONS

"Overview of Variable-Speed Power-Turbine Research", https://core.ac.uk/download/pdf/10560017.pdf, Aug. 30, 2019.
(Continued)

*Primary Examiner* — Sherry L Estremsky
(74) *Attorney, Agent, or Firm* — Getz Balich LLC (57) ABSTRACT

An engine assembly is provided that includes a sun gear, a ring gear, a plurality of intermediate gears, a carrier, a first rotating structure, a second rotating structure and a first bearing. The ring gear is rotatable about an axis and circumscribes the sun gear. The intermediate gears are arranged circumferentially about the axis in an array. Each of the intermediate gears is radially between and meshed with the sun gear and the ring gear. The carrier is rotatable about the axis. Each of the intermediate gears is rotatably mounted to the carrier. The first rotating structure is configured as or otherwise includes the carrier. The second rotating structure is configured as or otherwise includes the ring gear. The first bearing is radially between and engaged with the first rotating structure and the second rotating structure.

15 Claims, 10 Drawing Sheets

(56) References Cited

U.S. PATENT DOCUMENTS

| | | | |
|---|---|---|---|
| 5,209,428 A | 5/1993 | Bevilaqua | |
| 5,452,988 A | 9/1995 | Short | |
| 6,148,605 A | 11/2000 | Lardellier | |
| 6,269,627 B1 | 8/2001 | Freese | |
| 6,270,037 B1 | 8/2001 | Freese | |
| 7,481,062 B2 | 1/2009 | Gaines | |
| 8,820,478 B2* | 9/2014 | Gauthier | F02C 3/107 184/6.12 |
| 8,834,119 B2* | 9/2014 | Balk | B63H 3/082 416/129 |
| 8,967,950 B2 | 3/2015 | Charier | |
| 9,017,028 B2 | 4/2015 | Fabre | |
| 9,039,567 B2* | 5/2015 | Fabre | F02C 7/06 475/331 |
| 10,107,135 B2* | 10/2018 | Schwarz | F02C 3/04 |
| 10,138,757 B2 | 11/2018 | Witlicki | |
| 10,215,054 B2 | 2/2019 | Anglin | |
| 10,337,409 B2 | 7/2019 | Bedrine | |
| 10,578,028 B2 | 3/2020 | Becker, Jr. | |
| 10,663,054 B2 | 5/2020 | Gravina | |
| 10,669,946 B2 | 6/2020 | Sheridan | |
| 10,822,101 B2 | 11/2020 | Murrow | |
| 10,876,411 B2 | 12/2020 | Ramirez | |
| 10,914,234 B1 | 2/2021 | Steven | |
| 10,954,813 B2 | 3/2021 | Wuestenberg | |
| 10,968,748 B2 | 4/2021 | Ramirez | |
| 11,015,533 B2 | 5/2021 | Sheridan | |
| 11,060,587 B1 | 7/2021 | Kobayashi | |
| 11,073,160 B2 | 7/2021 | Murugan | |
| 11,077,949 B2 | 8/2021 | Behrens | |
| 11,162,545 B2 | 11/2021 | Bauduin | |
| 11,162,575 B2* | 11/2021 | Sheridan | F02C 7/36 |
| 11,168,616 B2 | 11/2021 | Kupratis | |
| 11,186,378 B2 | 11/2021 | Dubreuil | |
| 11,199,103 B2 | 12/2021 | Wolfer | |
| 11,215,122 B2* | 1/2022 | Sheridan | F16H 57/08 |
| 11,745,888 B2 | 9/2023 | Harvey | |
| 11,815,145 B2 | 11/2023 | Huschenhoefer | |
| 11,891,967 B2 | 2/2024 | Yesilcimen | |
| 2003/0049118 A1 | 3/2003 | Bruno | |
| 2009/0320491 A1 | 12/2009 | Copeland | |
| 2012/0133155 A1 | 5/2012 | Sorg | |
| 2012/0177493 A1 | 7/2012 | Fabre | |
| 2013/0045102 A1 | 2/2013 | Gallet | |
| 2014/0010652 A1 | 1/2014 | Suntharalingam | |
| 2014/0290265 A1 | 10/2014 | Ullyott | |
| 2014/0364265 A1 | 12/2014 | Bentgen | |
| 2015/0011354 A1 | 1/2015 | Fabre | |
| 2015/0274287 A1 | 10/2015 | Robertson | |
| 2016/0076393 A1 | 3/2016 | Sheridan | |
| 2016/0185460 A1 | 6/2016 | Cedoz | |
| 2016/0195096 A1 | 7/2016 | Otto | |
| 2016/0229531 A1 | 8/2016 | Robertson | |
| 2017/0051679 A1 | 2/2017 | Becker, Jr. | |
| 2018/0009536 A1 | 1/2018 | Christopherson | |
| 2018/0135512 A1 | 5/2018 | Poulin | |
| 2018/0266316 A1 | 9/2018 | Soulat | |
| 2018/0328289 A1 | 11/2018 | Madge | |
| 2019/0024582 A1 | 1/2019 | Poulin | |
| 2019/0061924 A1 | 2/2019 | Kita | |
| 2019/0382123 A1 | 12/2019 | Schwarz | |
| 2020/0017229 A1 | 1/2020 | Steinert | |
| 2020/0070990 A1 | 3/2020 | Harvey | |
| 2020/0088053 A1 | 3/2020 | Fiore | |
| 2020/0108937 A1 | 4/2020 | Behrens | |
| 2020/0182158 A1 | 6/2020 | Kupratis | |
| 2020/0191062 A1 | 6/2020 | Sheridan | |
| 2020/0240427 A1 | 7/2020 | Teuber | |
| 2020/0307812 A1 | 10/2020 | Dubreuil | |
| 2020/0307818 A1 | 10/2020 | Dubreuil | |
| 2020/0340406 A1 | 10/2020 | Maljean | |
| 2020/0354068 A1 | 11/2020 | Razak | |
| 2020/0400077 A1 | 12/2020 | Redford | |
| 2021/0054784 A1 | 2/2021 | O'Flarity | |
| 2021/0078700 A1 | 3/2021 | Klemen | |
| 2021/0087977 A1 | 3/2021 | Becoulet | |
| 2021/0179286 A1 | 6/2021 | Harvey | |
| 2021/0229796 A1 | 7/2021 | Mitrovic | |
| 2021/0317800 A1 | 10/2021 | Yesilcimen | |
| 2022/0235699 A1 | 7/2022 | Desjardins | |
| 2022/0349350 A1 | 11/2022 | Hrubec | |
| 2023/0228216 A1 | 7/2023 | Miller | |
| 2023/0228231 A1 | 7/2023 | Miller | |
| 2023/0382548 A1 | 11/2023 | Hanrahan | |
| 2023/0382549 A1 | 11/2023 | Hanrahan | |
| 2023/0383700 A1 | 11/2023 | Hanrahan | |
| 2024/0052784 A1 | 2/2024 | Hanrahan | |
| 2024/0060453 A1 | 2/2024 | Hanrahan | |
| 2024/0077033 A1 | 3/2024 | Hanrahan | |
| 2024/0077034 A1 | 3/2024 | Hanrahan | |

FOREIGN PATENT DOCUMENTS

| | | |
|---|---|---|
| DE | 1119675 B | 12/1961 |
| EP | 2535528 B1 | 4/2021 |
| GB | 1439988 A | 6/1976 |
| WO | 2016090390 A1 | 6/2016 |

OTHER PUBLICATIONS

"Overview of Variable-Speed Power-Turbine Research", https://www.science.gov/topicpages/v/variable-speed+power+turbine, Jan. 1, 2011.

"RVLT TC1.1: Variable Speed Power Turbine Tech Demo", https://techport.nasa.gov/view/93071, Jul. 21, 2021.

Ashlie Flegel, "Aerodynamic Measurements of a Variable-Speed Power-Turbine Blade Section in a Transonic Turbine Cascade" https://engagedscholarship.csuohio.edu/cgi/viewcontent.cgi?article=1852&context=etdarchive, May 2007.

Flegel-McVetta et al. "Aerodynamic Measurements of a Variable-Speed Power-Turbine Blade Section in a Transonic Turbine Cascade at Low Inlet Turbulence", NASA/TM-2013-218069, Aug. 2013.

EP Search Report for EP Patent Application No. 24203731.5 dated Feb. 24, 2025.

\* cited by examiner

BEARING ARRANGEMENT FOR TURBINE ENGINE GEARTRAIN

BACKGROUND OF THE DISCLOSURE

1. Technical Field

This disclosure relates generally to a turbine engine and, more particularly, to a geartrain for the turbine engine.

2. Background Information

Various types and configurations of geartrains and support systems for geartrains for an aircraft propulsion system are known in the art. While these known aircraft propulsion system geartrains and support systems have various benefits, there is still room in the art for improvement.

SUMMARY OF THE DISCLOSURE

According to an aspect of the present disclosure, an engine assembly is provided that includes a sun gear, a ring gear, a plurality of intermediate gears, a carrier, a first rotating structure, a second rotating structure and a first bearing. The ring gear is rotatable about an axis and circumscribes the sun gear. The intermediate gears are arranged circumferentially about the axis in an array. Each of the intermediate gears is radially between and meshed with the sun gear and the ring gear. The carrier is rotatable about the axis. Each of the intermediate gears is rotatably mounted to the carrier. The first rotating structure is configured as or otherwise includes the carrier. The second rotating structure is configured as or otherwise includes the ring gear. The first bearing is radially between and engaged with the first rotating structure and the second rotating structure.

According to another aspect of the present disclosure, another engine assembly is provided that includes a sun gear, a ring gear, a plurality of intermediate gears, a carrier, a first rotating structure and a plurality of bearings. The sun gear is rotatable about an axis. The ring gear is rotatable about the axis and circumscribes the sun gear. The intermediate gears are arranged circumferentially about the axis in an array. Each of the intermediate gears is radially between and meshed with the sun gear and the ring gear. The carrier is rotatable about the axis. Each of the intermediate gears is rotatably mounted to the carrier. The first rotating structure is configured as or otherwise include the carrier. The bearings are arranged axially along the first rotating structure. Each of the bearings is configured to support rotation of the first rotating structure about the axis.

According to still another aspect of the present disclosure, another engine assembly is provided that includes a propulsor rotor, a geartrain, a rotating assembly, a first rotating structure and a plurality of bearings. The geartrain is configured as or otherwise includes an epicyclic gear system. The epicyclic gear system includes a carrier. The rotating assembly includes a turbine rotor. The rotating assembly is coupled to the propulsor rotor through the geartrain. The first rotating structure is configured as or otherwise includes the carrier. The bearings are arranged axially along the first rotating structure. Each of the bearings is configured to support rotation of the first rotating structure about the axis.

The engine assembly may include a stationary structure circumscribing the first rotating structure. The bearings may include a first bearing. The first bearing may be radially between and engaged with the first rotating structure and the stationary structure.

The engine assembly may also include a second rotating structure rotatable about the axis. The bearings may include a first bearing. The first bearing may be radially between and engaged with the first rotating structure and the second rotating structure.

The engine assembly may include a stationary structure and a second bearing. The stationary structure may circumscribe the first rotating structure. The second bearing may be radially between and engaged with the first rotating structure and the stationary structure.

The first bearing and the second bearing may be arranged on opposing axial sides of the array of the intermediate gears.

The first bearing may circumscribe the first rotating structure. The second rotating structure may circumscribe the first bearing.

The sun gear may be rotatable about the axis.

The engine assembly may also include a first propulsor rotor, a geartrain and a rotating assembly. The geartrain may include the sun gear, the ring gear, the intermediate gears and the carrier. The rotating assembly may include a turbine rotor. The rotating assembly may be configured to drive the first propulsor rotor through the geartrain.

The engine assembly may also include an engine core. The engine core may include a compressor section, a combustor section, a turbine section and the rotating assembly. The turbine section may include the turbine rotor.

The engine assembly may also include a second propulsor rotor. The rotating assembly may be configured to drive rotation of the second propulsor rotor.

The rotating assembly may be coupled to the second propulsor rotor independent of the geartrain.

The axis may be a first axis, and the first propulsor rotor may be rotatable about the first axis. The second propulsor rotor may be rotatable about a second axis that is angularly offset from the first axis.

The engine assembly may also include a second sun gear, a second ring gear, a plurality of second intermediate gears and a second carrier. The second ring gear may circumscribe the second sun gear. The second intermediate gears may be arranged circumferentially about the axis in an array. Each of the second intermediate gears may be radially between and meshed with the second sun gear and the second ring gear. The second carrier may be rotatable about the axis. Each of the second intermediate gears may be rotatably mounted to the second carrier. The second rotating structure may also include the second carrier.

The second sun gear may be rotatable about the axis.

The second ring gear may be rotatable about the axis.

The engine assembly may also include a geartrain and a rotating assembly. The geartrain may include the sun gear, the ring gear, the intermediate gears, the carrier, the second sun gear, the second ring gear, the second intermediate gears and the second carrier. The rotating assembly may include a turbine rotor. The rotating assembly may be coupled to the geartrain through the sun gear and/or the second sun gear.

The engine assembly may also include a first propulsor rotor coupled to the geartrain through the second ring gear. The rotating assembly may be configured to drive the first propulsor rotor through the geartrain.

The first bearing may be disposed axially between the array of the intermediate gears and the array of the second intermediate gears.

The first bearing may be configured as or otherwise include a rolling element bearing.

The engine assembly may also include a lock device configured to lock rotation of the first rotating structure or the second rotating structure about the axis.

The engine assembly may also include a brake configured to brake rotation of the first rotating structure or the second rotating structure about the axis.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
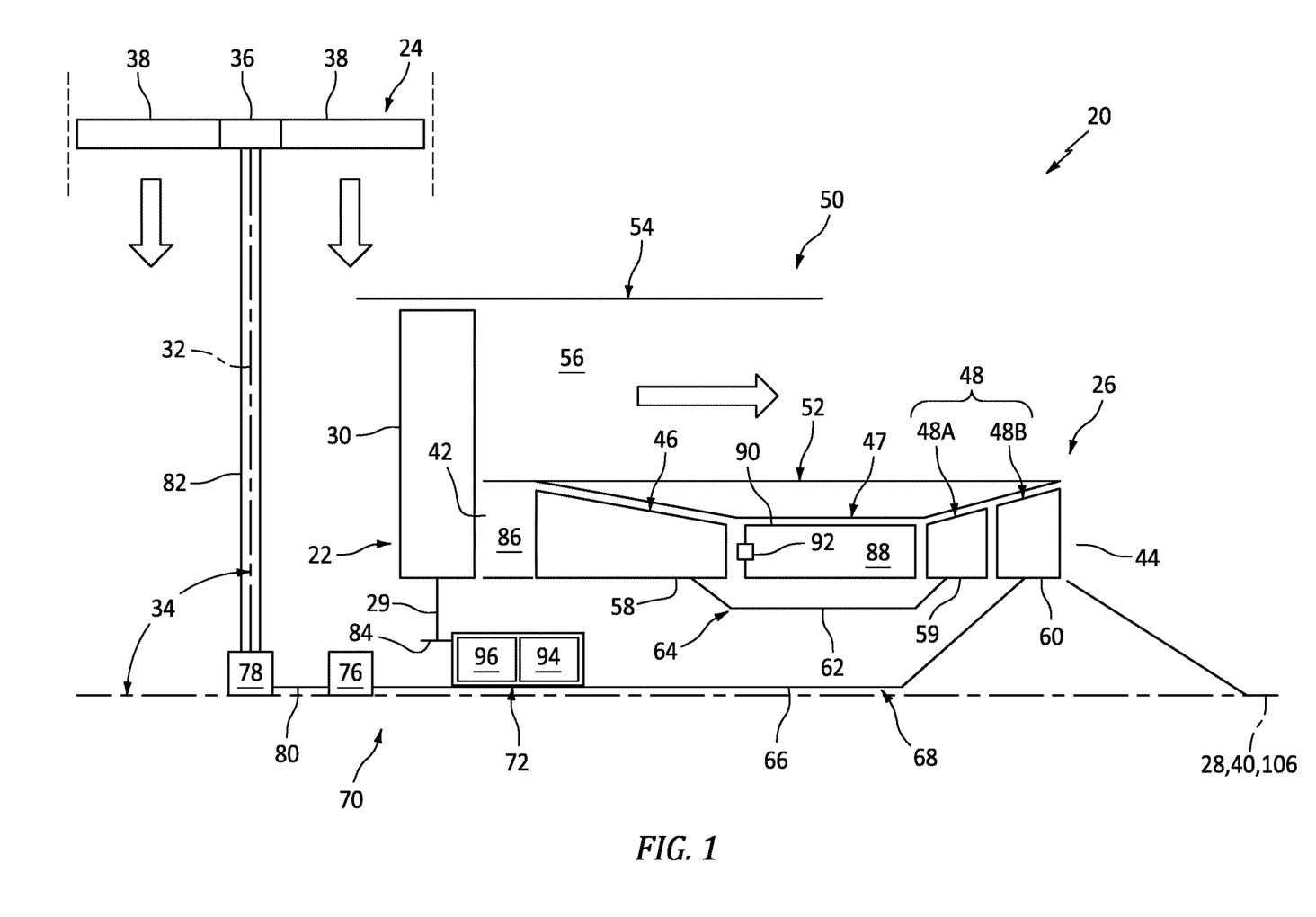
FIG. 1 is a partial, schematic illustration of an aircraft propulsion system.

FIG. 1 schematically illustrates a propulsion system 20 for an aircraft. The aircraft may be an airplane, a helicopter, a drone (e.g., an unmanned aerial vehicle (UAV)), a spacecraft or any other manned or unmanned aerial vehicle or system. This aircraft may be configured as a vertical take-off and landing (VTOL) aircraft or a short take-off and vertical landing (STOVL) aircraft. The aircraft propulsion system 20 of FIG. 1, for example, is configured to generate power for first direction propulsion (e.g., propulsive thrust) during a first mode of operation and to generate power for second direction propulsion (e.g., propulsive lift) during a second mode of operation, where the first direction is different than (e.g., angularly offset from) the second direction. The first mode may be a horizontal flight mode (e.g., a forward flight mode) where the first direction propulsion is substantially horizontal propulsive thrust; e.g., within five degrees (5°), ten degrees (10°), etc. of a horizontal axis. The second mode may be a vertical flight and/or hover mode where the second direction propulsion is substantially vertical propulsive lift; e.g., within five degrees (5°), ten degrees (10°), etc. of a vertical axis. The aircraft propulsion system 20, of course, may also be configured to generate both the first direction propulsion (e.g., horizontal propulsion) and the second direction propulsion (e.g., vertical propulsion) during a third mode (e.g., a transition mode) of operation.

The aircraft propulsion system 20 of FIG. 1 includes one or more bladed propulsor rotors such as, for example, at least one bladed first propulsor rotor 22 and at least one bladed second propulsor rotor 24. The aircraft propulsion system 20 of FIG. 1 also includes a gas turbine engine with a core 26 configured to rotatably drive the one or more propulsor rotors—the first propulsor rotor 22 and/or the second propulsor rotor 24.

The first propulsor rotor 22 may be configured as a ducted rotor such as a fan rotor. Of course, in other embodiments, the first propulsor rotor 22 may alternatively be configured as an open rotor (e.g., an un-ducted rotor) such as a propeller rotor, a pusher fan rotor or the like. The first propulsor rotor 22 of FIG. 1 is rotatable about a first rotor axis 28. This first rotor axis 28 is an axial centerline of the first propulsor rotor 22 and may be horizontal when the aircraft is on ground and/or during level aircraft flight. The first propulsor rotor 22 includes at least a first rotor disk 29 (or a hub) and a plurality of first rotor blades 30 (one visible in FIG. 1); e.g., fan blades. The first rotor blades 30 are distributed circumferentially around the first rotor disk 29 in an annular array. Each of the first rotor blades 30 is connected to and projects radially (relative to the first rotor axis 28) out from the first rotor disk 29.

The second propulsor rotor 24 may be configured as an open rotor such as a propeller rotor or a helicopter (e.g., main) rotor. Of course, in other embodiments, the second propulsor rotor 24 may alternatively be configured as a ducted rotor such as a fan rotor; e.g., see dashed line duct. The second propulsor rotor 24 of FIG. 1 is rotatable about a second rotor axis 32. This second rotor axis 32 is an axial centerline of the second propulsor rotor 24 and may be vertical when the aircraft is on the ground and/or during level aircraft flight. The second rotor axis 32 is angularly offset from the first rotor axis 28 by an included angle 34; e.g., an acute angle or a right angle. This included angle 34 may be between sixty degrees (60°) and ninety degrees (90°); however, the present disclosure is not limited to such an exemplary relationship. The second propulsor rotor 24 includes at least a second rotor disk 36 (or a hub) and a plurality of second rotor blades 38; e.g., open rotor blades. The second rotor blades 38 are distributed circumferentially around the second rotor disk 36 in an annular array. Each of the second rotor blades 38 is connected to and projects radially (relative to the second rotor axis 32) out from the second rotor disk 36.

The engine core 26 extends axially along a core axis 40 from a forward, upstream airflow inlet 42 into the engine core 26 to an aft, downstream combustion products exhaust 44 from the engine core 26. The core axis 40 may be an axial centerline of the engine core 26 and may be horizontal when the aircraft is on the ground and/or during level aircraft flight. This core axis 40 may be parallel (e.g., coaxial) with the first rotor axis 28 and, thus, angularly offset from the second rotor axis 32. The engine core 26 of FIG. 1 includes a compressor section 46, a combustor section 47 and a turbine section 48. The turbine section 48 of FIG. 1 includes a high pressure turbine (HPT) section 48A and a low pressure turbine (LPT) section 48B (also sometimes referred to as a power turbine section).

The engine sections 46-48B may be arranged sequentially along the core axis 40 within an engine housing 50. This engine housing 50 includes an inner case 52 (e.g., a core case) and an outer case 54 (e.g., a fan case). The inner case 52 may house one or more of the engine sections 46-48B; e.g., the engine core 26. The outer case 54 may house the first propulsor rotor 22. The outer case 54 of FIG. 1 also axially overlaps and extends circumferentially about (e.g., completely around) the inner case 52 thereby at least partially forming a (e.g., annular) bypass flowpath 56 radially between the inner case 52 and the outer case 54.

Each of the engine sections 46, 48A, 48B includes a bladed rotor 58-60 within that respective engine section 46, 48A, 48B. Each of these engine rotors 58-60 includes a plurality of rotor blades arranged circumferentially around and connected to one or more respective rotor disks (or hubs). The rotor blades, for example, may be formed integral with or mechanically fastened, welded, brazed and/or otherwise attached to the respective rotor disk(s) (or hub(s)).

The compressor rotor 58 is connected to the HPT rotor 59 through a high speed shaft 62. At least (or only) these engine components 58, 59 and 62 collectively form a high speed rotating assembly 64; e.g., a high speed spool. This high speed rotating assembly 64 is rotatable about the core axis 40. The LPT rotor 60 is connected to a low speed shaft 66. At least (or only) these engine components 60 and 66 collectively form a low speed rotating assembly 68; e.g., a low speed spool. This low speed rotating assembly 68 is rotatable about the core axis 40. The low speed rotating assembly 68 and, more particularly, its low speed shaft 66 may project axially through a bore of the high speed rotating assembly 64 and its high speed shaft 62.

The aircraft propulsion system 20 of FIG. 1 and its turbine engine include a drivetrain 70 that couples the low speed rotating assembly 68 to the first propulsor rotor 22 and that couples the low speed rotating assembly 68 to the second propulsor rotor 24. The drivetrain 70 of FIG. 1 includes a geartrain 72, a transmission 76 and a gearing 78; e.g., bevel gearing. The drivetrain 70 of FIG. 1 also includes one or more shafts 80 and 82 and/or other intermediate torque transmission devices for coupling the low speed rotating assembly 68 and its low speed shaft 66 to the second propulsor rotor 24. The drivetrain 70 may also include one or more intermediate torque transmission devices for coupling the geartrain 72 to the first propulsor rotor 22; e.g., a first propulsor shaft 84.

An input into the geartrain 72 is coupled to the low speed rotating assembly 68 and its low speed shaft 66, where the low speed rotating assembly 68 forms a power input for the geartrain 72. An output from the geartrain 72 is coupled to the first propulsor rotor 22 through the first propulsor shaft 84, where the first propulsor rotor 22 forms a power output (e.g., load) for the geartrain 72.

An input into the transmission 76 may be coupled to the low speed rotating assembly 68 independent of the geartrain 72. The low speed rotating assembly 68, for example, may be coupled to the input of the geartrain 72 and the input of the transmission 76 in parallel. The input of the transmission 76 of FIG. 1, in particular, is (e.g., directly or indirectly) connected to the LPT rotor 60 through the low speed shaft 66; e.g., without passing through the geartrain 72. An output from the transmission 76 is connected to an input into the gearing 78 through the transmission output shaft 80.

The transmission 76 may be configured to selectively couple (e.g., transfer mechanical power between) the low speed rotating assembly 68 and the transmission output shaft 80. During the first mode of operation, for example, the transmission 76 may be configured to decouple the low speed rotating assembly 68 from the transmission output shaft 80, thereby decoupling the low speed rotating assembly 68 from the second propulsor rotor 24. During the second mode of operation (and the third mode of operation), the transmission 76 may be configured to couple the low speed rotating assembly 68 with the transmission output shaft 80, thereby coupling the low speed rotating assembly 68 with the second propulsor rotor 24. The transmission 76 may be configured as a clutched transmission or a clutchless transmission.

An output from the gearing 78 is connected to the second propulsor rotor 24 through the second propulsor shaft 82. This gearing 78 provides a coupling between the transmission output shaft 80 rotating about the axis 28, 40 and the second propulsor shaft 82 rotating about the second rotor axis 32. The gearing 78 may also provide a speed change mechanism between the transmission output shaft 80 and the second propulsor shaft 82. The gearing 78, however, may alternatively provide a 1:1 rotational coupling between the transmission output shaft 80 and the second propulsor shaft 82 such that these shafts 80 and 82 rotate at a common (e.g., the same) rotational velocity. Furthermore, in some embodiments, the gearing 78 and the transmission output shaft 80 may be omitted where the functionality of the gearing 78 is integrated into the transmission 76. In still other embodiments, the transmission 76 may be omitted where decoupling of the second propulsor rotor 24 is not required and/or where an optional additional speed change between the low speed rotating assembly 68 and the second propulsor rotor 24 is not required.

During operation of the aircraft propulsion system 20, air enters the engine core 26 through the core inlet 42. This air is directed into a (e.g., annular) core flowpath 86, which core flowpath 86 extends sequentially through the compressor section 46, the combustor section 47, the HPT section 48A and the LPT section 48B from the core inlet 42 to the core exhaust 44. The air within this core flowpath 86 may be referred to as core air.

The core air is compressed by the compressor rotor 58 and directed into a (e.g., annular) combustion chamber 88 of a (e.g., annular) combustor 90 in the combustor section 47. Fuel is injected into the combustion chamber 88 through one or more fuel injectors 92 (one visible in FIG. 1) and mixed with the compressed core air to provide a fuel-air mixture. This fuel-air mixture is ignited and combustion products thereof flow through and sequentially cause the HPT rotor 59 and the LPT rotor 60 to rotate. The rotation of the HPT rotor 59 drives rotation of the high speed rotating assembly 64 and its compressor rotor 58. The rotation of the LPT rotor 60 drives rotation of the low speed rotating assembly 68. The rotation of the low speed rotating assembly 68 drives rotation of the first propulsor rotor 22 through the geartrain 72 during one or more modes of operation; e.g., the first, the second and the third modes of operation. The rotation of the low speed rotating assembly 68 drives rotation of the second propulsor rotor 24 (e.g., independent of the geartrain 72) during one or more modes of operation; e.g., the second and the third modes of operation. During the first mode of operation, the transmission 76 may decouple the low speed rotating assembly 68 from the second propulsor rotor 24 such that the low speed rotating assembly 68 does not drive rotation of the second propulsor rotor 24. The second propulsor rotor 24 may thereby be stationary (or windmill) during the first mode of operation.

During the first and the third modes of operation, the rotation of the first propulsor rotor 22 propels bypass air (separate from the core air) through the aircraft propulsion system 20 and its bypass flowpath 56 to provide the first direction propulsion; e.g., the forward, horizontal thrust. During the second and the third modes of operation, the rotation of the second propulsor rotor 24 propels additional air (separate from the core air and the bypass air) to provide the second direction propulsion; e.g., vertical lift. The aircraft may thereby takeoff, land and/or otherwise hover during the second and the third modes of operation, and the aircraft may fly forward or otherwise move during the first and the third modes of operation. The bypass air may also flow through the bypass flowpath 56 during the second and the third modes of operation; however, a quantity of the bypass air flowing through the bypass flowpath 56 during the second mode of operation may be de minimis as described below in further detail.

Figure 2:
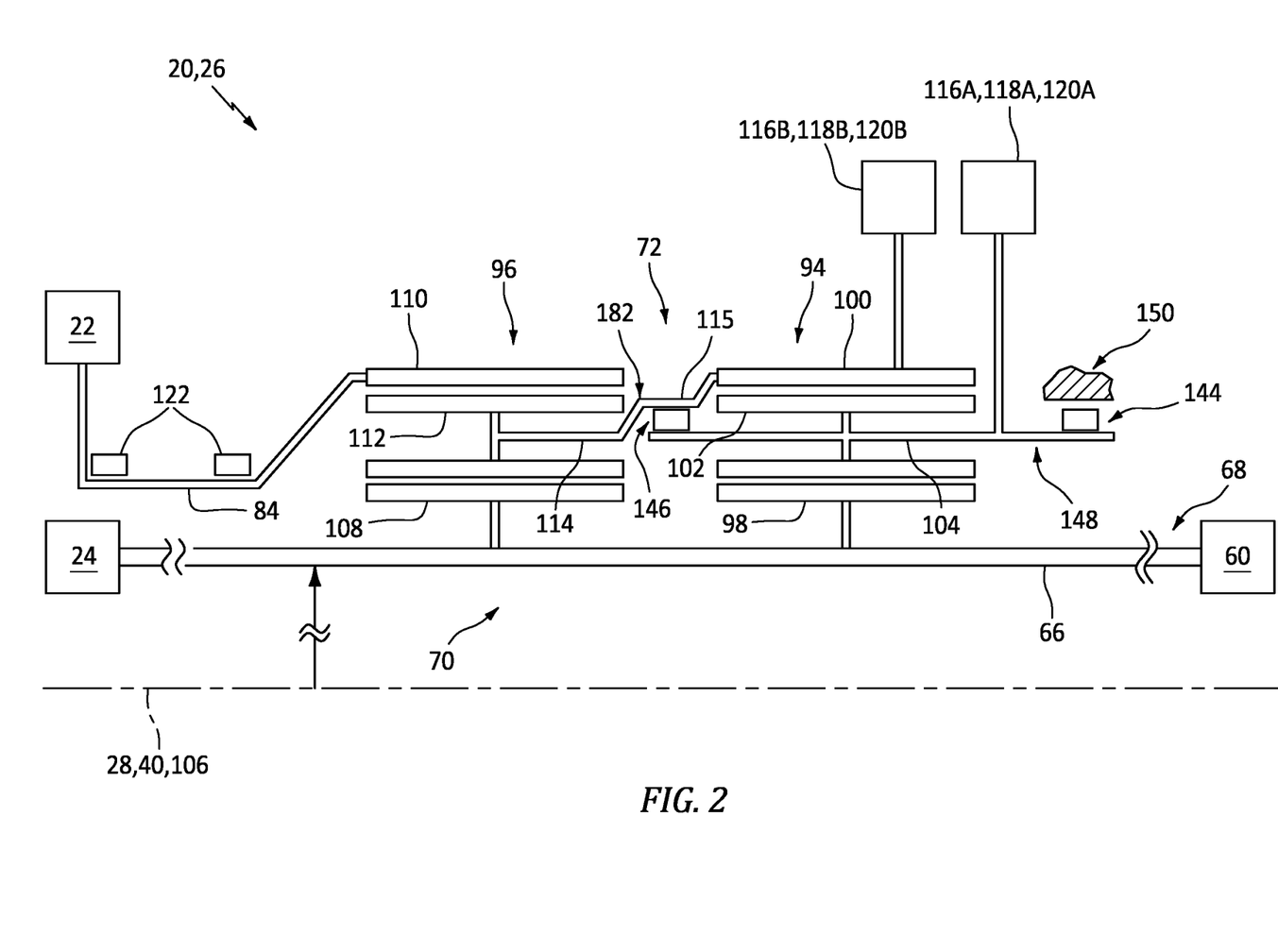
FIG. 2 is a schematic illustration of a portion of a drivetrain with a geartrain.
Figure 3:
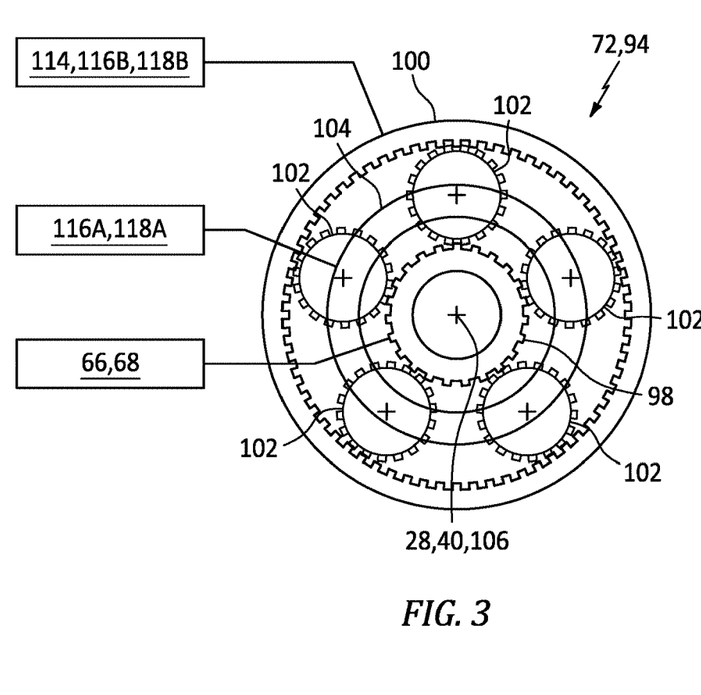
FIG. 3 is a schematic illustration of a first gear system of the geartrain coupled with various components of the aircraft propulsion system.

Referring to FIG. 2, the geartrain 72 may include multiple (e.g., epicyclic) interconnected gear systems 94 and 96. Referring to FIGS. 2 and 3, the first gear system 94 has a plurality of first gear system components including a first sun gear 98, a first ring gear 100, a plurality of first intermediate gears 102 and a first carrier 104. The first sun gear 98 is rotatable about a rotational axis 106 of the geartrain 72, which rotational axis 106 may be parallel (e.g., coaxial) with the axis 28, 40. The first ring gear 100 circumscribes the first sun gear 98 and the first intermediate gears 102. The first ring gear 100 is rotatable about the axis 28, 40, 106. The first intermediate gears 102 are arranged circumferentially about the axis 28, 40, 106 and the first sun gear 98 in an array. Each of the first intermediate gears 102 is disposed radially between and meshed with the first sun gear 98 and the first ring gear 100. Each of the first intermediate gears 102 is rotatably mounted to the first carrier 104. The first carrier 104 is rotatable about the axis 28, 40, 106.

Figure 4:
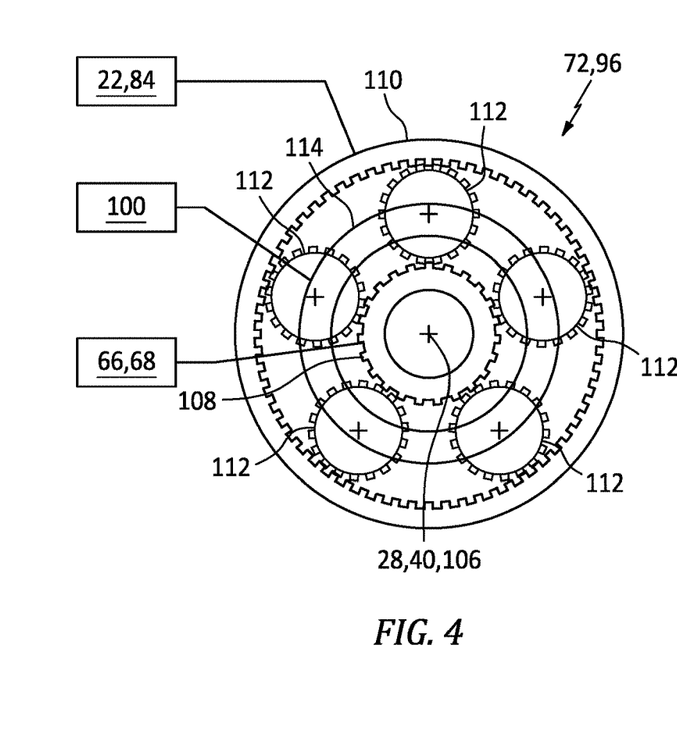
FIG. 4 is a schematic illustration of a second gear system of the geartrain coupled with various components of the aircraft propulsion system.

Referring to FIGS. 2 and 4, the second gear system 96 has a plurality of second gear system components including a second sun gear 108, a second ring gear 110, a plurality of second intermediate gears 112 and a second carrier 114. The second sun gear 108 is rotatable about the axis 28, 40, 106. The second ring gear 110 circumscribes the second sun gear 108 and the second intermediate gears 112. The second ring gear 110 is rotatable about the axis 28, 40, 106. The second intermediate gears 112 are arranged circumferentially about the axis 28, 40, 106 and the second sun gear 108 in an array. Each of the second intermediate gears 112 is disposed radially between and meshed with the second sun gear 108 and the second ring gear 110. Each of the second intermediate gears 112 is rotatably mounted to the second carrier 114. The second carrier 114 is rotatable about the axis 28, 40, 106. This second carrier 114 of FIG. 2 is coupled to (e.g., via an inter-system shaft 115 and/or another drive element) and rotatable with the first ring gear 100, where the second carrier 114 and the first ring gear 100 are configured to rotate at a common rotational velocity.

The first propulsor rotor 22 is coupled to the geartrain 72 and its second gear system 96 through the second ring gear 110. The first propulsor shaft 84 (and/or another drive element), for example, may couple the first propulsor rotor 22 to the second ring gear 110. The first propulsor shaft 84 of FIG. 2 extends between and is connected to the first propulsor rotor 22 and the second ring gear 110. The low speed rotating assembly 68 and its low speed shaft 66 are coupled to the geartrain 72 and its first gear system 94 through the first sun gear 98. The low speed rotating assembly 68 and its low speed shaft 66 are also coupled to the geartrain 72 and its second gear system 96 through the second sun gear 108. The first sun gear 98 and the second sun gear 108 of FIG. 2, for example, are each (e.g., independently) connected to the low speed rotating assembly 68 and its low speed shaft 66. With such an arrangement, the low speed rotating assembly 68 and its LPT rotor 60 are configured to (e.g., independently) drive rotation of the first sun gear 98 and the second sun gear 108, where the first sun gear 98, the second sun gear 108 and the LPT rotor 60 are rotate at a common rotational velocity.

The aircraft propulsion system 20 and its drivetrain 70 may include one or more brakes 116A and 116B (generally referred to as "116") and/or one or more lock devices 118A and 118B (generally referred to as "118"). The first brake 116A and/or the first lock device 118A may be located at a first location 120A, or another suitable location. The second brake 116B and/or the second lock device 118B may be located at a second location 120B, or another suitable location.

Figure 5:
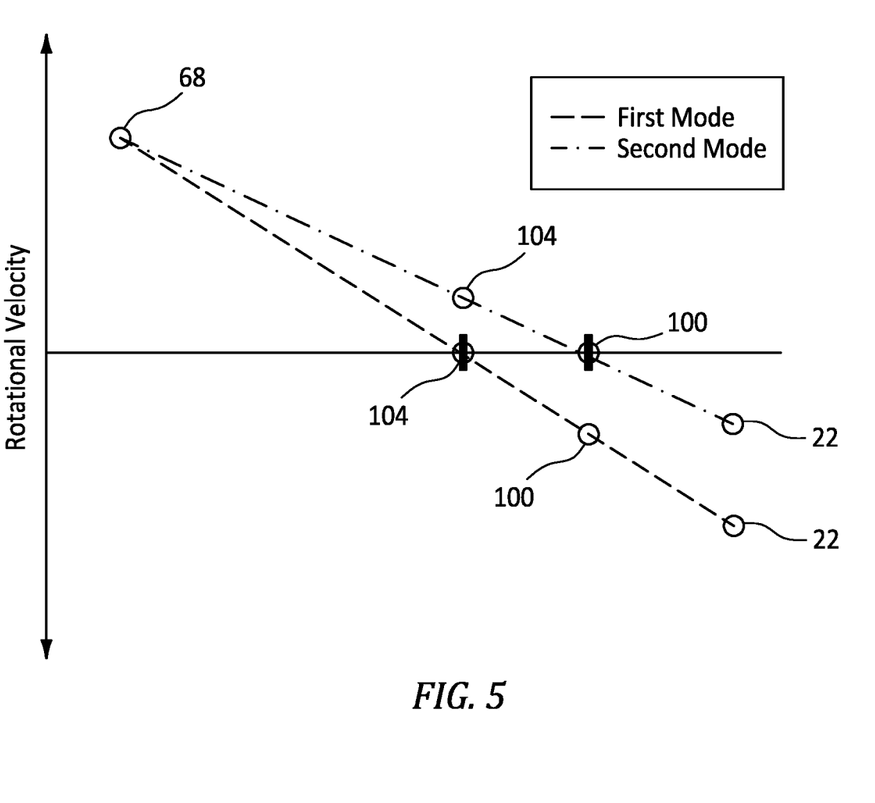
FIG. 5 is a graph depicting changes to rotational speeds during various modes of propulsion system operation.

The first brake 116A of FIG. 2 is configured to brake (e.g., slow and/or stop) rotation of the first carrier 104 about the axis 28, 40, 106. The second lock device 118B is configured to lock (e.g., fix, prevent) rotation of the first ring gear 100 and the second carrier 114 about the axis 28, 40, 106, for example, following the braking of the second carrier 114 to a zero rotational speed about the axis 28, 40, 106 using the second brake 116B. When the second carrier 114 is rotationally fixed (e.g., during the second mode of operation of FIG. 5), a rotational speed of the first propulsor rotor 22 may decrease (compared to when the second carrier 114 is free to rotate).

Reducing the rotational speed of the first propulsor rotor 22 during, for example, the second mode of operation reduces or substantially eliminates (e.g., de minimis) the first direction propulsive thrust generated by the first propulsor rotor 22. Reducing first propulsor rotor thrust may, in turn, increase power available for driving rotation of the second propulsor rotor 24 and/or facilitate substantial second direction aircraft movement; e.g., without first direction aircraft movement. However, maintaining some rotation of the first propulsor rotor 22 may maintain lubrication of one or more bearings (e.g., bearings 122 in FIG. 2) supporting the first propulsor rotor 22 and/or prevent bearing related damage. For example, when a component supported by a bearing is not rotating, shock loads may damage one of more internal components of the bearing. Examples of such bearing damage may include, but are not limited to, brinelling and false brinelling. Maintaining some rotation of the first propulsor rotor 22 of FIG. 1 may also or alternatively prevent an exhaust backflow through the bypass flowpath 56 into the core inlet 42. Maintaining some rotation of the first propulsor rotor 22 may still also or alternatively prevent debris (e.g., sand, dirt, dust, etc.) from entering the core inlet 42 during the second mode of operation where the aircraft is more likely to be near the ground; e.g., for landing or takeoff.

The second brake 116B of FIG. 2 is configured to brake (e.g., slow and/or stop) rotation of the first ring gear 100 about the axis 28, 40, 106 and, thus, rotation of the second carrier 114 about the axis 28, 40, 106. The first lock device 118A is configured to lock (e.g., fix, prevent) rotation of the first carrier 104 about the axis 28, 40, 106. With this arrangement, the geartrain 72 and its first gear system 94 and its second gear system 96 are configured to transfer additional power from the low speed rotating assembly 68 and its LPT rotor 60 to the first propulsor rotor 22 and any drivetrain element(s) therebetween (when included). This power transfer may be substantially all (e.g., minus losses in the drivetrain 70) of the power output from the low speed rotating assembly 68 and its LPT rotor 60 when the second propulsor rotor 24 is rotationally decoupled from the low speed rotating assembly 68; e.g., using the transmission 76 of FIG. 1. The geartrain 72 may thereby provide a multi-speed transmission between the low speed rotating assembly 68 and the first propulsor rotor 22, where a speed ratio between the low speed rotating assembly 68 and the first propulsor rotor 22 during the second mode is less than a speed ratio between the low speed rotating assembly 68 and the first propulsor rotor 22 during the first mode.

To enter the third mode of operation from the first mode of operation, the first lock device 118A may be disengaged and/or the first brake 116A may be released (if currently applied). The second propulsor rotor 24 may thereby begin to rotate along with the already rotating first propulsor rotor 22. Similarly, to enter the third mode of operation from the second mode of operation, the second lock device 118B may be disengaged and/or the second brake 116B may be released (if currently applied). The first propulsor rotor 22 may thereby begin to rotate faster along with the already rotating second propulsor rotor 24. When both of the first propulsor rotor 22 and the second propulsor rotor 24 are rotating/free to rotate, the drivetrain 70 may transfer (e.g., all, minus losses in the drivetrain 70) the power output from the low speed rotating assembly 68 and its LPT rotor 60 to (a) the first propulsor rotor 22 and the drivetrain element(s) therebetween and (b) the second propulsor rotor 24 and the drivetrain element(s) therebetween (e.g., independent of the geartrain 72 and its first gear system 94 and its second gear system 96).

Figure 6:
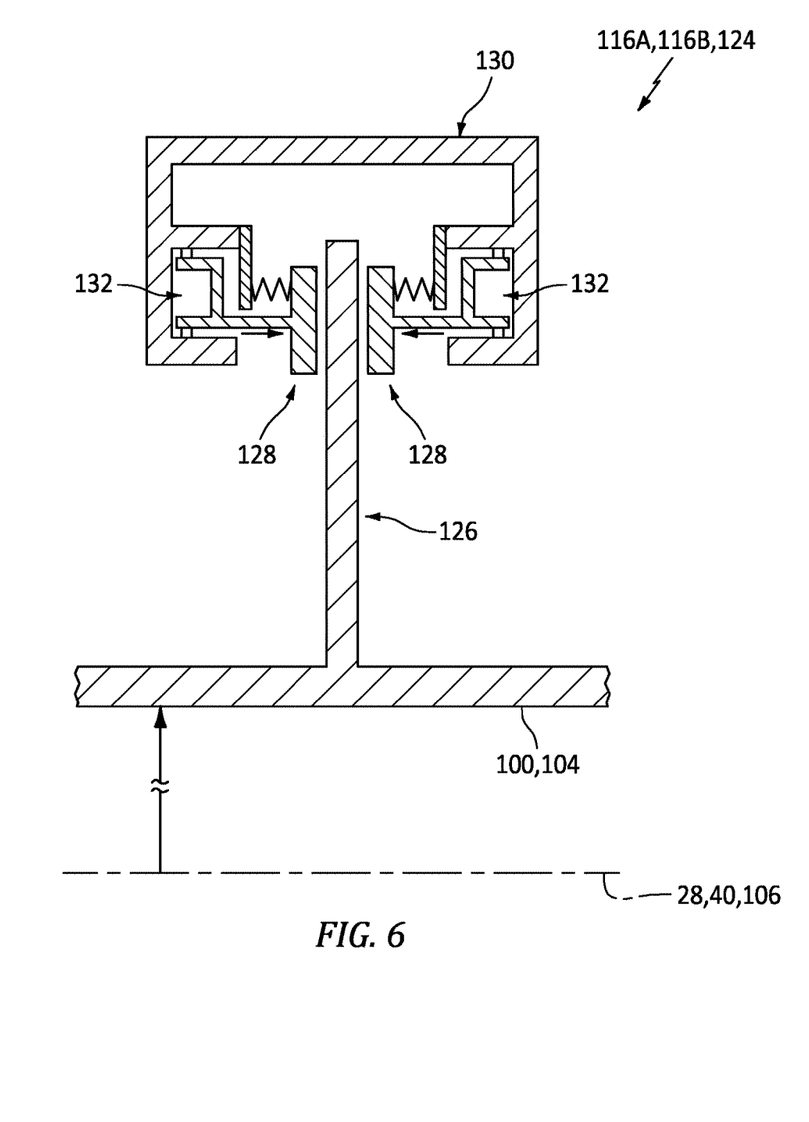
FIG. 6 is a partial, side sectional illustration of a rotating assembly configured with a brake.

Referring to FIG. 6, the first brake 116A and/or the second brake 116B may each be configured as or otherwise include a disk brake 124. The disk brake 124 of FIG. 6 includes a brake rotor 126 and one or more brake pads 128. The brake rotor 126 is configured rotatable with the respective geartrain member 104, 100. The brake rotor 126, for example, may be connected to and rotatable with the respective geartrain member 104, 100, or another rotating element (directly or indirectly) rotatable with the respective geartrain member 104, 100. The brake pads 128 are anchored to a brake housing 130, which may be part of the engine housing 50 (see FIG. 1) and/or an airframe of the aircraft. The brake pads 128 may be actuated by one or more brake actuators 132 (e.g., hydraulic brake actuators) to move the brake pads 128 from an open position to a closed position. In the open position, the brake pads 128 are spaced from and do not engage (e.g., contact) the brake rotor 126 (see position of FIG. 6). In the closed position, the brake pads 128 engage (e.g., contact) and clamp onto (e.g., squeeze) the brake rotor 126. Frictional rubbing between the brake pads 128 and the brake rotor 126 is operable to brake rotation of the brake rotor 126 and, thus, the respective geartrain member 104, 100 (or another rotating element) connected thereto. The first and the second brakes 116 of the present disclosure, however, are not limited to such an exemplary disk brake configuration. For example, it is contemplated the first and/or the second brake 116B may alternatively be configured as another type of brake such as a drum brake or a set of clutch plates.

Figure 7:
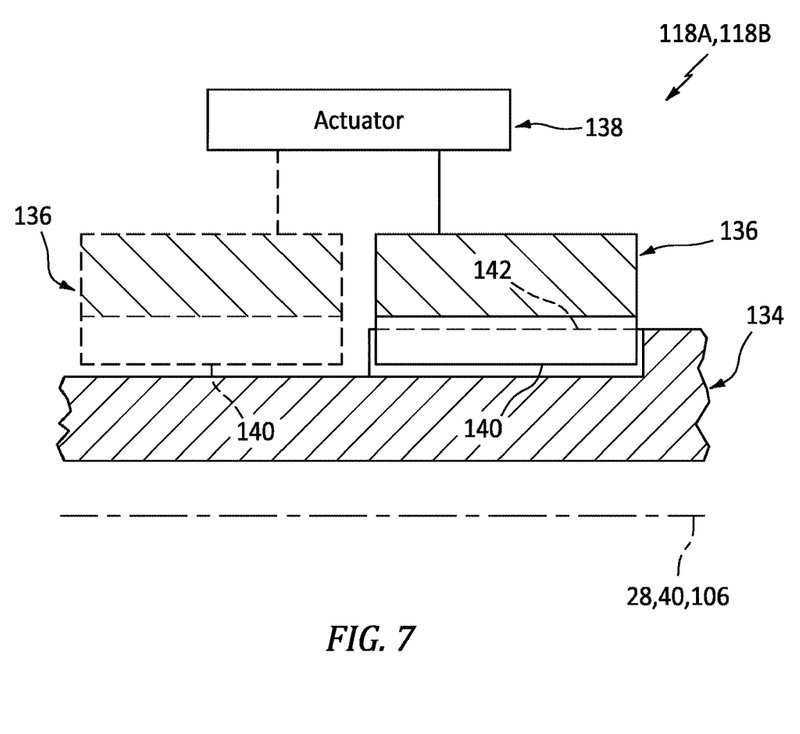
FIG. 7 is a partial, side sectional schematic illustration of a lock device.

Referring to FIG. 7, the first lock device 118A and/or the second lock device 118B may each be configured as a splined lock device; e.g., a splined coupling. The lock device 118 of FIG. 7, for example, includes an inner lock element 134 (e.g., a splined shaft), an outer lock element 136 (e.g., a splined sleeve) and an actuator 138. The inner lock element 134 is rotatable about the axis 28, 40, 106. The outer lock element 136 is rotationally fixed about the axis 28, 40, 106. However, the actuator 138 is configured to move (e.g., axially translate) the outer lock element 136 along the axis 28, 40, 106 and the inner lock element 134 between an unlocked position (see dashed line in FIG. 7) and a locked position (see solid line in FIG. 7; see also FIG. 8). At the unlocked position, inner splines 140 of the outer lock element 136 are disengaged (e.g., spaced) from outer splines 142 of the inner lock element 134. At the locked position, the inner splines 140 of the outer lock element 136 are engaged (e.g., meshed) with the outer splines 142 of the inner lock element 134 (see also FIG. 8). With this arrangement, when the lock device 118 is unlocked and its outer lock element 136 is in the unlocked position, the inner lock element 134 may rotate (e.g., freely, unencumbered by the outer lock element 136) about the axis 28, 40, 106. However, when the lock device 118 is locked and its outer lock element 136 is in the locked position of FIG. 8, the outer lock element 136 is meshed with the inner lock element 134 and prevents rotation of the inner lock element 134 about the axis 28, 40, 106.

Figure 8:
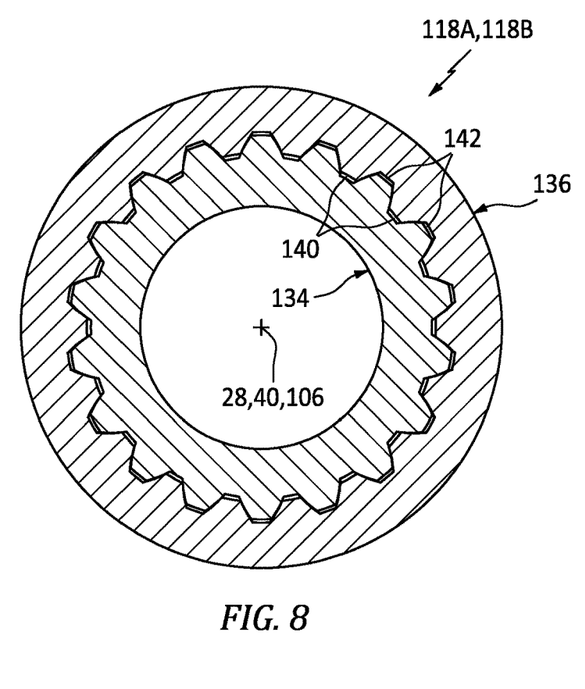
FIG. 8 is a cross-sectional illustration of the lock device of FIG. 7.

Referring to FIGS. 2 and 7, the inner lock element 134 of the first lock device 118A may be configured as part of or may be attached (directly or indirectly) to the first carrier 104, or any other element rotatable therewith. The inner lock element 134 of the second lock device 118B may be configured as part of or may be attached (directly or indirectly) to the first ring gear 100, or any other element rotatable therewith. While the inner lock element 134 of FIGS. 7 and 8 is described as the rotating element and the outer lock element 136 is described as the rotationally fixed element, the operation of these elements may be switched in other embodiments. In particular, the inner lock element 134 may alternatively be configured as the rotationally fixed element and axially translatable by the actuator 138, and the outer lock element 136 may be configured as the rotating element. Furthermore, various other types of rotational lock devices are known in the art, and the present disclosure is not limited to any particular ones thereof.

Referring to FIG. 2, the geartrain 72 includes one or more bearings 144 and 146 for rotatably supporting and/or locating (e.g., centering) one or more of its geartrain members; e.g., 100, 104 and/or 114. The bearings 144 and 146 may be disposed to opposing axial sides of the first gear system 94. The bearings 144 and 146 of FIG. 2, for example, are arranged on opposing axial sides of the sun gear 98, opposing axial sides of the first ring gear 100 and/or opposing axial sides of the array of the first intermediate gears 102. More particularly, the carrier bearing 144 of FIG. 2 is disposed aft of the first gear system members 98, 100 and 102, where the carrier bearing 144 is axially between the first gear system members 98, 100 and 102 and the LPT rotor 60. The inter-system bearing 146 of FIG. 2 is disposed forward of the first gear system members 98, 100 and 102, where the first gear system members 98, 100 and 102 are disposed axially between the inter-system bearing 146 and the LPT rotor 60. This inter-system bearing 146 is also disposed axially between the first gear system members 98, 100 and 102 and the second gear system members 108, 110 and 112.

Figure 9:
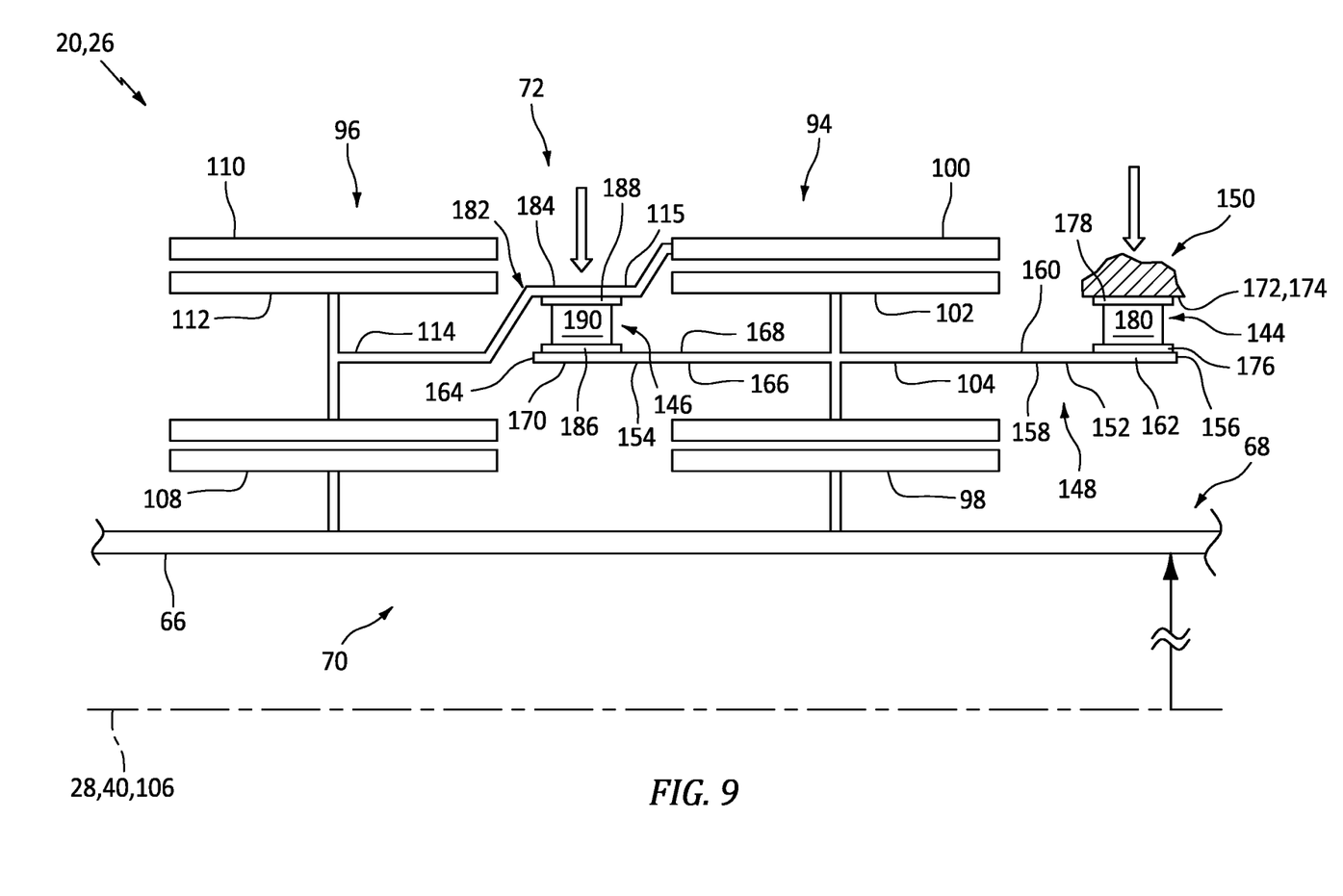
FIG. 9 is a partial, side sectional schematic illustration of the geartrain with a first bearing arrangement.

Referring to FIG. 9, the carrier bearing 144 is arranged radially between and engaged with a first rotating structure 148 of the geartrain 72 and a stationary structure 150 of the gas turbine engine and its engine core 26 (e.g., a frame, a support, a mount, etc.). The first rotating structure 148 may form, or may otherwise be connected to and rotatable with, a first component of the geartrain 72 and its first gear system 94. The first rotating structure 148 of FIG. 9, for example, forms the first carrier 104. The first rotating structure 148 of FIG. 9, in particular, includes the first carrier 104, a first carrier support shaft 152 and a second carrier support shaft 154.

The first carrier support shaft 152 is connected to (e.g., formed integral with or otherwise fixedly attached to) and rotatable with the first carrier 104. This first carrier support shaft 152 projects axially out (e.g., in an aft direction away from the geartrain 72 and its first gear system 94, and towards the LPT rotor 60/away from the first propulsor rotor 22 of FIG. 2) from the first carrier 104 along the axis 28, 40, 106 to an axial aft distal end 156 of the first rotating structure 148 and its first carrier support shaft 152. The first carrier support shaft 152 extends radially from a radial inner side 158 of the first carrier support shaft 152 to a radial outer side 160 of the first carrier support shaft 152. This first carrier support shaft 152 includes a (e.g., cylindrical) rotating carrier bearing land 162 at (e.g., on, adjacent or proximate) the outer side 160 of the first carrier support shaft 152.

The second carrier support shaft 154 is connected to (e.g., formed integral with or otherwise fixedly attached to) and rotatable with the first carrier 104. This second carrier support shaft 154 projects axially out (e.g., in a forward direction away from the geartrain 72 and its first gear system 94, and away from the LPT rotor 60/towards the first propulsor rotor 22 of FIG. 2) from the first carrier 104 along the axis 28, 40, 106 to an axial forward distal end 164 of the first rotating structure 148 and its second carrier support shaft 154. The second carrier support shaft 154 extends radially from a radial inner side 166 of the second carrier support shaft 154 to a radial outer side 168 of the second carrier support shaft 154. This second carrier support shaft 154 includes a (e.g., cylindrical) rotating inner inter-system bearing land 170 at (e.g., on, adjacent or proximate) the outer side 168 of the second carrier support shaft 154. The second carrier support shaft 154 may be radially aligned with the first carrier support shaft 152. The inner inter-system bearing land 170 of FIG. 9, for example, is radially inline with (e.g., shares a common radius with) the rotating carrier bearing land 162. The present disclosure, however, is not limited to such an exemplary arrangement.

The stationary structure 150 may be part of or otherwise fixedly connected to/anchored to the engine housing 50 (see FIG. 1) and/or an airframe of the aircraft. The stationary structure 150 extends radially inward to a radial inner side 172 of the stationary structure 150. The stationary structure 150 includes a (e.g., cylindrical) stationary carrier bearing land 174 at (e.g., on, adjacent or proximate) the inner side 172 of the stationary structure 150. This stationary carrier bearing land 174 is spaced radially outboard of and radially faces the rotating carrier bearing land 162. The stationary carrier bearing land 174 extends axially along and is axially aligned with the rotating carrier bearing land 162. The stationary carrier bearing land 174 extends circumferentially about the rotating carrier bearing land 162. The stationary structure 150 and its stationary carrier bearing land 174 thereby axially overlap and circumscribe the first carrier support shaft 152 and its rotating carrier bearing land 162.

The carrier bearing 144 is disposed radially between and is engaged with (e.g., is mounted with and/or contacts) the first carrier support shaft 152 and its rotating carrier bearing land 162 and the stationary structure 150 and its stationary carrier bearing land 174. This carrier bearing 144 rotatably couples the first rotating structure 148 and its first carrier support shaft 152 to the stationary structure 150. The carrier bearing 144 of FIG. 9, for example, is configured as a rolling element bearing. This carrier bearing 144 includes a carrier bearing inner race 176, a carrier bearing outer race 178 and a plurality of carrier bearing rolling elements 180. The inner race 176 circumscribes and is mounted to the first carrier support shaft 152 and its rotating carrier bearing land 162; however, it is contemplated the inner race 176 may alternatively be configured integral with the first carrier support shaft 152 and its rotating carrier bearing land 162. The outer race 178 is nested in a bore of and is mounted to the stationary structure 150 and its stationary carrier bearing land 174; however, it is contemplated the outer race 178 may alternatively be configured integral with the stationary structure 150 and its stationary carrier bearing land 174. The rolling elements 180 are arranged circumferentially about the axis 28, 40, 106 in an array, where the array of the rolling elements 180 circumscribes the inner race 176. Each bearing element 180 is disposed radially between and is engaged with (e.g., contacts) the inner race 176 and the outer race 178.

The inter-system bearing 146 is arranged radially between and engaged with the first rotating structure 148 of the geartrain 72 and a second rotating structure 182 of the geartrain 72. The second rotating structure 182 may form, or may otherwise be connected to and rotatable with, a second component of the geartrain 72 and its first gear system 94 and/or a third component of the geartrain 72 and its second gear system 96. The second rotating structure 182 of FIG. 9, for example, forms the first ring gear 100 and the second carrier 114. The second rotating structure 182 of FIG. 9, in particular, includes the first ring gear 100, the second carrier 114 and the inter-system shaft 115.

The second rotating structure 182 and its inter-system shaft 115 includes a (e.g., cylindrical) rotating outer inter-system bearing land 184. This outer inter-system bearing land 184 is spaced radially outboard of and radially faces the inner inter-system bearing land 170. The outer inter-system bearing land 184 extends axially along and is axially aligned with the inner inter-system bearing land 170. The outer inter-system bearing land 184 extends circumferentially about the inner inter-system bearing land 170. The inter-system shaft 115 and its outer inter-system bearing land 184 thereby axially overlap and circumscribe the second carrier support shaft 154 and its inner inter-system bearing land 170.

The inter-system bearing 146 is disposed radially between and is engaged with (e.g., is mounted with and/or contacts) the second carrier support shaft 154 and its inner inter-system bearing land 170 and the inter-system shaft 115 and its outer inter-system bearing land 184. This inter-system bearing 146 rotatably couples the first rotating structure 148 and its second carrier support shaft 154 to the second rotating structure 182 and its inter-system shaft 115. The inter-system bearing 146 of FIG. 9, for example, is configured as a rolling element bearing. This inter-system bearing 146 includes an inter-system bearing inner race 186, an inter-system bearing outer race 188 and a plurality of inter-system bearing rolling elements 190. The inner race 186 circumscribes and is mounted to the second carrier support shaft 154 and its inner inter-system bearing land 170; however, it is contemplated the inner race 186 may alternatively be configured integral with the second carrier support shaft 154 and its inner inter-system bearing land 170. The outer race 188 is nested in a bore of and is mounted to the second rotating structure 182 and its outer inter-system bearing land 184; however, it is contemplated the outer race 188 may alternatively be configured integral with the second rotating structure 182 and its outer inter-system bearing land 184. The rolling elements 190 are arranged circumferentially about the axis 28, 40, 106 in an array, where the array of the rolling elements 190 circumscribes the inner race 186. Each rolling element 190 is disposed radially between and is engaged with (e.g., contacts) the inner race 186 and the outer race 188.

By supporting the first rotating structure 148 with the carrier bearing 144 and the inter-system bearing 146 and arranging those bearings 144 and 146 to opposing axial sides of the first gear system 94, a radial force exerted on the first intermediate gears 102 and, thus, the first carrier 104 through the first sun gear 98 and/or the first ring gear 100 may be substantially balanced. Provision of the carrier bearing 144 and the inter-system bearing 146 may thereby reduce or eliminate a bending moment at a meshed gear interface between the gears 98 and 102 and/or a meshed gear interface between the gears 100 and 102. Moreover, the carrier bearing 144 and the inter-system bearing 146 may support and locate (e.g., center) the rotation of the first rotating structure 148 and its first carrier 104 about the axis 28, 40, 106. The inter-system bearing 146 may also support and locate (e.g., center) the rotation of the second rotating structure 182 and its members 100 and 114 about the axis 28, 40, 106.

Figure 10:
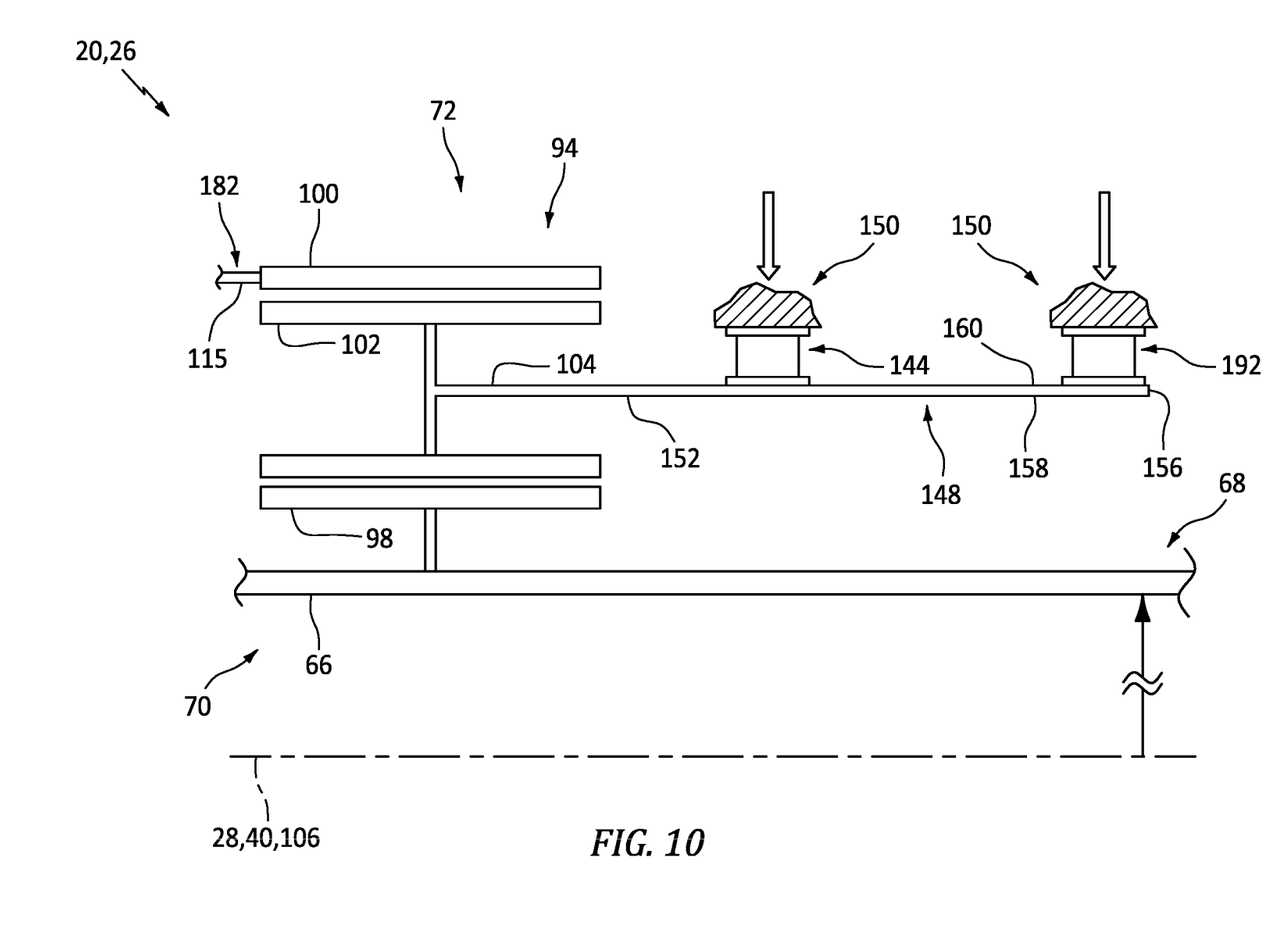
FIG. 10 is a partial, side sectional schematic illustration of the geartrain with a second bearing arrangement.

The bearings 144 and 146 of FIG. 9 are disposed to opposing axial sides of the first gear system 94. The present disclosure, however, is not limited to such an exemplary arrangement. For example, referring to FIG. 10, the inter-system bearing 146 (see FIG. 9) may be replaced by a second carrier bearing 192, which second carrier bearing 192 may have a similar configuration as the first carrier bearing 144. Here, both carrier bearings 144 and 192 are mounted to and rotatably couple the first rotating structure 148 and its first carrier support shaft 152 and the stationary structure 150. These carrier bearings 144 and 192 are arranged axially along the first rotating structure 148 and its first carrier support shaft 152, where the first carrier bearing 144 is disposed axially between and spaced axially from the array of the first intermediate gears 102 and the second carrier bearing 192. Here, both of the carrier bearings 144 and 192 are disposed to a common axial side of the first gear system members 98, 100 and 102; e.g., axially between the first gear system members 98, 100 and 102 and the LPT rotor 60 (see FIG. 2). With this arrangement, a radial force exerted on the first intermediate gears 102 and, thus, the first carrier 104 through the first sun gear 98 and/or the first ring gear 100 may be substantially balanced out by reaction forces through the carrier bearings 144 and 192.

Each of the bearings 144, 146, 192 may be configured as a rolling element bearing as described above. However, in other embodiments, it is contemplated one or more of the bearings 144, 146 and/or 192 may alternatively each be configured as a journal bearing or another type of bearing.

In some embodiments, referring to FIG. 2, the first sun gear 98 and the second sun gear 108 may each be independently connected (e.g., connected in parallel) to the low speed rotating assembly 68 and its low speed shaft 66. In other embodiments, however, the second sun gear 108 may be connected to the low speed rotating assembly 68 and its low speed shaft 66 through the first sun gear 98. The second sun gear 108, for example, may be rotationally fixed to the first sun gear 98. In still other embodiments, the first sun gear 98 may be connected to the low speed rotating assembly 68 and its low speed shaft 66 through the second sun gear 108. The first sun gear 98, for example, may be rotationally fixed to the second sun gear 108.

In some embodiments, referring to FIG. 2, the low speed rotating assembly 68 and its low speed shaft 66 may be connected to the transmission 76 (see FIG. 1) and, thus, the second propulsor rotor 24 independent of (e.g., in parallel with) geartrain 72. In other embodiments, however, the transmission 76 and, thus, the second propulsor rotor 24 may be coupled to the low speed rotating assembly 68 and its low speed shaft 66 through the first sun gear 98 or the second sun gear 108, but not though the rest of the first gear system 94 and the second gear system 96. Thus, while power may be transferred from the low speed rotating assembly 68 to the second propulsor rotor 24 through the sun gear(s) 98 and/or 108, the output from the geartrain 72 to the transmission 76 may still rotate with the low speed rotating assembly 68 at a common rotational velocity.

Figure 11:
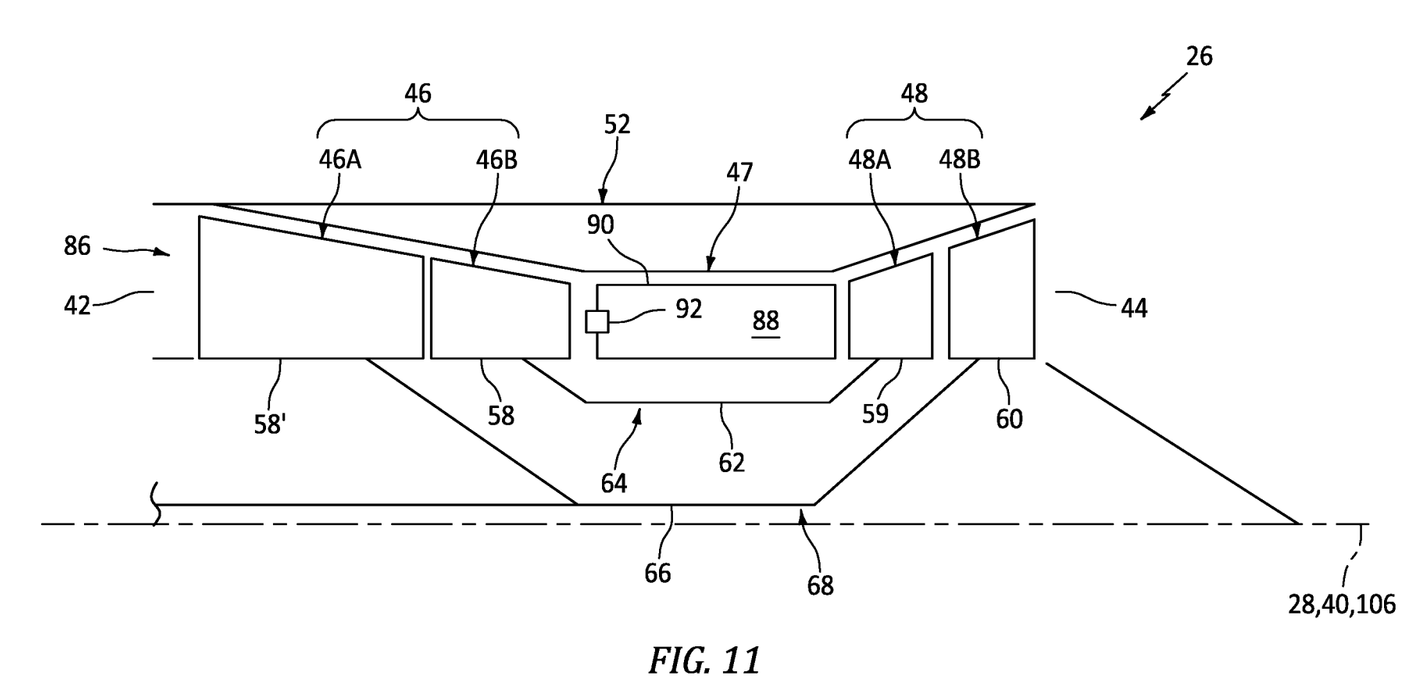
FIG. 11 is a partial, schematic illustration of a gas turbine engine core.

In some embodiments, referring to FIG. 1, the low speed rotating assembly 68 may be configured without a compressor rotor. In other embodiments, referring to FIG. 11, the low speed rotating assembly 68 may include a low pressure compressor (LPC) rotor 58' arranged within a low pressure compressor (LPC) section 46A of the compressor section 46. In such embodiments, the compressor rotor 58 may be a high pressure compressor (HPC) rotor 58 within a high pressure compressor (HPC) section 46B of the compressor section 46.

Figure 12:
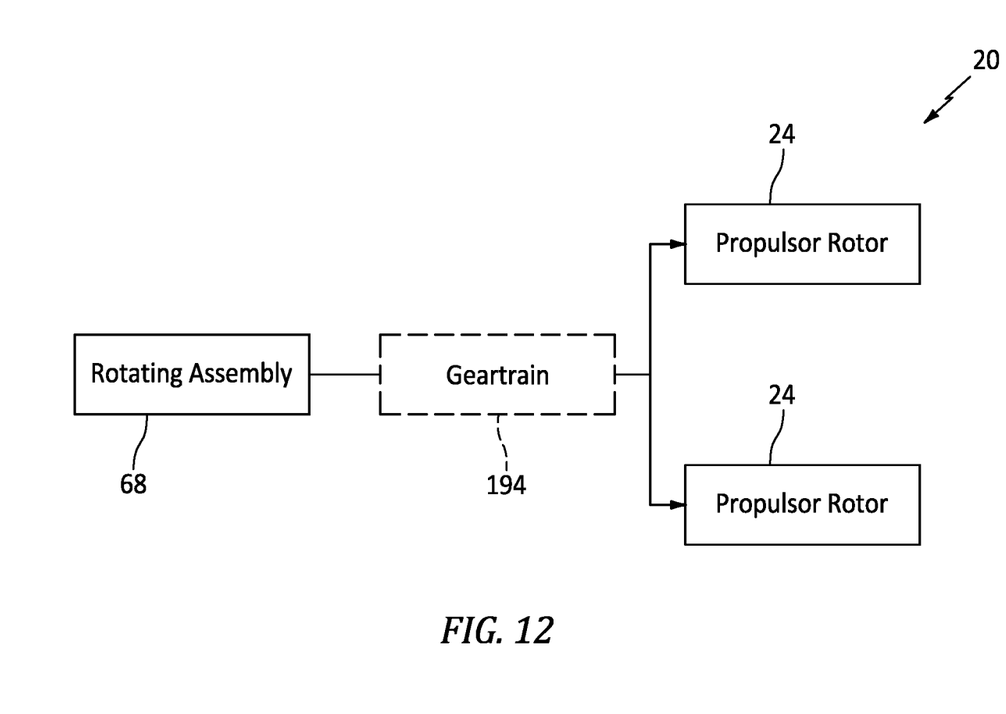
FIG. 12 is a partial, schematic illustration of a rotating structure coupled to and driving multiple propulsor rotors for generating propulsive lift.

The engine core 26 (e.g., see FIG. 1) may have various configurations other than those described above. The engine core 26, for example, may be configured with a single spool, with two spools (e.g., see FIGS. 1 and 11), or with more than two spools. The engine core 26 may be configured with one or more axial flow compressor sections, one or more radial flow compressor sections, one or more axial flow turbine sections and/or one or more radial flow turbine sections. The engine core 26 may be configured with any type or configuration of annular, tubular (e.g., CAN), axial flow and/or reverser flow combustor. The present disclosure therefore is not limited to any particular types or configurations of gas turbine engine cores. Furthermore, it is contemplated the engine core 26 of the present disclosure may drive more than the two propulsor rotors 22 and 24, or a single one of the propulsor rotors 22, 24 and/or one or more other mechanical loads; e.g., electric machines, electric generators, electric motors, etc. The aircraft propulsion system 20, for example, may include two or more of the first propulsor rotors 22 and/or two or more of the second propulsor rotors 24. For example, the aircraft propulsion system 20 of FIG. 12 includes multiple second propulsor rotors 24 rotatably driven by the low speed rotating assembly 68. These second propulsor rotors 24 may rotate about a common axis. Alternatively, each second propulsor rotor 24 may rotate about a discrete axis where, for example, the second propulsor rotors 24 are laterally spaced from one another and coupled to the low speed rotating assembly 68 through a power splitting geartrain 194.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An engine assembly, comprising:
a sun gear;
a ring gear rotatable about an axis and circumscribing the sun gear;
a plurality of intermediate gears arranged circumferentially about the axis in an array, each of the plurality of intermediate gears radially between and meshed with the sun gear and the ring gear;
a carrier rotatable about the axis, each of the plurality of intermediate gears rotatably mounted to the carrier;
a first rotating structure comprising the carrier;
a second rotating structure comprising the ring gear;
a first bearing radially between and engaged with the first rotating structure and the second rotating structure;
a stationary structure circumscribing the first rotating structure; and
a second bearing radially between and engaged with the first rotating structure and the stationary structure;
wherein the first bearing and the second bearing are arranged on opposing axial sides of the array of the plurality of intermediate gears.

2. The engine assembly of claim 1, wherein
the first bearing circumscribes the first rotating structure; and
the second rotating structure circumscribes the first bearing.

3. The engine assembly of claim 1, wherein the sun gear is rotatable about the axis.

4. The engine assembly of claim 1, further comprising:
a first propulsor rotor;
a geartrain including the sun gear, the ring gear, the plurality of intermediate gears and the carrier; and
a rotating assembly comprising a turbine rotor, the rotating assembly configured to drive the first propulsor rotor through the geartrain.

5. The engine assembly of claim 4, further comprising:
a second propulsor rotor;
the rotating assembly configured to drive rotation of the second propulsor rotor.

6. The engine assembly of claim 1, wherein the first bearing comprises a rolling element bearing.

7. The engine assembly of claim 1, further comprising a lock device configured to lock rotation of the first rotating structure or the second rotating structure about the axis.

8. The engine assembly of claim 1, further comprising a brake configured to brake rotation of the first rotating structure or the second rotating structure about the axis.

9. An engine assembly, comprising:
a sun gear;
a ring gear rotatable about an axis and circumscribing the sun gear;
a plurality of intermediate gears arranged circumferentially about the axis in an array, each of the plurality of intermediate gears radially between and meshed with the sun gear and the ring gear;
a carrier rotatable about the axis, each of the plurality of intermediate gears rotatably mounted to the carrier;
a first rotating structure comprising the carrier;
a second rotating structure comprising the ring gear;
a first bearing radially between and engaged with the first rotating structure and the second rotating structure, wherein the first rotating structure is radially inboard of the first bearing and the second rotating structure is radially outboard of the first bearing;
a stationary structure circumscribing the first rotating structure; and
a second bearing radially between and engaged with the first rotating structure and the stationary structure.

10. An engine assembly, comprising:
a sun gear;
a ring gear rotatable about an axis and circumscribing the sun gear;
a plurality of intermediate gears arranged circumferentially about the axis in an array, each of the plurality of intermediate gears radially between and meshed with the sun gear and the ring gear;
a carrier rotatable about the axis, each of the plurality of intermediate gears rotatably mounted to the carrier;
a first rotating structure comprising the carrier;
a second rotating structure comprising the ring gear;
a first bearing radially between and engaged with the first rotating structure and the second rotating structure;
a second sun gear;
a second ring gear circumscribing the second sun gear;
a plurality of second intermediate gears arranged circumferentially about the axis in an array, each of the plurality of second intermediate gears radially between and meshed with the second sun gear and the second ring gear; and
a second carrier rotatable about the axis, each of the plurality of second intermediate gears rotatably mounted to the second carrier;
the second rotating structure further comprising the second carrier.

11. The engine assembly of claim 10, wherein the second sun gear is rotatable about the axis.

12. The engine assembly of claim 10, wherein the second ring gear is rotatable about the axis.

13. The engine assembly of claim 10, further comprising:
a geartrain including the sun gear, the ring gear, the plurality of intermediate gears, the carrier, the second sun gear, the second ring gear, the plurality of second intermediate gears and the second carrier; and
a rotating assembly comprising a turbine rotor, the rotating assembly coupled to the geartrain through at least one of the sun gear or the second sun gear.

14. The engine assembly of claim 13, further comprising:
a first propulsor rotor coupled to the geartrain through the second ring gear;
the rotating assembly configured to drive the first propulsor rotor through the geartrain.

15. The engine assembly of claim 10, wherein the first bearing is disposed axially between the array of the plurality of intermediate gears and the array of the plurality of second intermediate gears.

* * * * *